(12) United States Patent
Specht et al.

(10) Patent No.: US 11,664,139 B2
(45) Date of Patent: May 30, 2023

(54) PROCESS FOR PRODUCING A MAGNETOCALORIC COMPOSITE MATERIAL AND A CORRESPONDING HEAT EXCHANGER

(71) Applicant: Magnotherm Solutions GmbH, Darmstadt (DE)

(72) Inventors: Marius Specht, Darmstadt (DE); Iliya Radulov, Bad König (DE); Tobias Braun, Grosskrotzenburg (DE); Konstantin Skokov, Darmstadt (DE); Valentin Brabänder, Rheinstetten (DE); Oliver Gutfleisch, Darmstadt (DE)

(73) Assignee: Magnotherm Solutions GmbH, Darmstadt (DE)

( * ) Notice: Subject to any disclaimer, the term of this patent is extended or adjusted under 35 U.S.C. 154(b) by 226 days.

(21) Appl. No.: 16/768,714

(22) PCT Filed: Oct. 23, 2018

(86) PCT No.: PCT/EP2018/079037
§ 371 (c)(1),
(2) Date: Jun. 1, 2020

(87) PCT Pub. No.: WO2019/110193
PCT Pub. Date: Jun. 13, 2019

(65) Prior Publication Data
US 2020/0321150 A1    Oct. 8, 2020

(30) Foreign Application Priority Data
Dec. 4, 2017   (DE) .................... 10 2017 128 765.5

(51) Int. Cl.
C23C 2/02 (2006.01)
H01F 1/01 (2006.01)
(Continued)

(52) U.S. Cl.
CPC ............. H01F 1/015 (2013.01); B22F 3/26 (2013.01); C23C 2/02 (2013.01); C23C 2/04 (2013.01);
(Continued)

(58) Field of Classification Search
CPC ...................................... C23C 2/02; C23C 2/04
See application file for complete search history.

(56) References Cited

U.S. PATENT DOCUMENTS 4,985,072 A    1/1991 Sahashi et al.
5,561,215 A *  10/1996 Pourreau ............... C09D 9/005
                                                           252/364
(Continued)

FOREIGN PATENT DOCUMENTS

DE   10 2009 002 640    1/2011
DE   10 2013 102 154    9/2013
(Continued)

Primary Examiner — Hai Y Zhang
(74) Attorney, Agent, or Firm — Clark & Brody LP

(57) ABSTRACT

A process is disclosed for producing a magnetocaloric composite material for a heat exchanger. The process comprises the following steps: Providing (S110) a plurality of particles (110) of a magnetocaloric material in a shaped body (200) and immersing the plurality of particles (110) present in the shaped body (200) into a bath in order to coat the particles by a chemical reaction and bond them to one another.

5 Claims, 4 Drawing Sheets

(51) Int. Cl.
  *B22F 3/26* (2006.01)
  *C23C 2/04* (2006.01)
  *F25B 21/00* (2006.01)

(52) U.S. Cl.
  CPC .......... *F25B 21/00* (2013.01); *B22F 2301/15* (2013.01); *F25B 2321/002* (2013.01)

(56) References Cited

U.S. PATENT DOCUMENTS

| | | | |
|---|---|---|---|
| 5,911,835 A * | 6/1999 | Lee | C11D 7/262 |
| | | | 257/E21.255 |
| 2007/0220901 A1 | 9/2007 | Kobayashi et al. | |
| 2010/0116471 A1 * | 5/2010 | Reppel | H01F 1/012 |
| | | | 428/323 |
| 2014/0117549 A1 * | 5/2014 | Tsunami | C25D 5/10 |
| | | | 438/653 |
| 2016/0161156 A1 | 6/2016 | Nagesh et al. | |

FOREIGN PATENT DOCUMENTS

| | | | | |
|---|---|---|---|---|
| EP | 0217347 | | 4/1987 | |
| EP | 2366186 | | 8/2016 | |
| JP | 2013-153165 | | 8/2013 | |
| KR | 20130112600 A | * | 10/2013 | ............. C01B 35/04 |
| WO | 2009/090442 | | 7/2009 | |
| WO | 2017/077071 | | 5/2017 | |

* cited by examiner

PROCESS FOR PRODUCING A MAGNETOCALORIC COMPOSITE MATERIAL AND A CORRESPONDING HEAT EXCHANGER

The present invention relates to a process for producing a magnetocaloric composite material, a heat exchanger with the magnetocaloric composite material and in particular to a pretreatment and nickel plating of magnetocaloric heat exchangers.

BACKGROUND

Magnetocaloric materials such as e.g. La(Fe,Mn,Si)$_{13}$H, gadolinium, Fe2P, or Ni—Mn—In based Heusler compounds are increasingly of interest for cooling units since the temperature difference reachable by remagnetizations is now sufficient for many applications. The heat exchangers present in the cooling units are often made as panels of solid starting material. The conventional manufacture of these panels is associated with high costs and effort, with the additional risk of fatigue failures due to embrittlement arising during permanent operation.

Porous magnetocaloric materials for use in heat exchangers can be made as composite materials, with a plurality of particles being bonded in a polymer or metal matrix in known processes. Particle-shaped magnetocaloric materials work most effectively here when they are shaped into a porous body with uniform channels. During this manufacture, it is important to achieve a mechanically-stable bond with high heat conductivity and good heat transfer to the transport medium (here: water).

The heat transfer is insufficient for polymer-bound heat exchangers. In the case of metal-bound variants, low melting metal alloys are used as the binding material, which are used in liquid form in order to immerse the plurality of magnetocaloric particles therein and bond them to one another at the same time. An example of such a compound of magnetocaloric particles is published in WO 2017/077071 Ai, with the metal alloy having bismuth, indium and zinc and optionally lead.

The magnetocaloric composite material resulting from conventional processes consists mainly of expensive and partially toxic components. However, complete coating of all particles cannot be ensured. Further problems with this approach are the considerable consumption of energy for melting the metallic composite material and the requirements for the shaped body in which the melted metal alloy is poured.

Therefore, there is a need for alternative options to provide a magnetocaloric composite material for heat exchangers.

Abstract

At least a part of the above-mentioned problems is solved by a process for producing a magnetocaloric composite material according to claim 1 and by a heat exchanger according to claim 6. The dependent claims define further advantageous embodiments of the process according to the invention.

The present invention relates to a process for producing a magnetocaloric composite material for a heat exchanger. The process comprises: providing a plurality of particles of a magnetocaloric material in a shaped body; and immersing the plurality of particles present in the shaped body into a bath, in particular a nickel bath in order to coat the particles by a chemical reaction and bond them to one another. The process relates not only to the nickel plating of particles, but in particular also to shaping of magnetocaloric heat exchangers (e.g. by nickel plating).

Optionally, the particles are pretreated with at least one of the following steps:
pretreating with a sodium hydroxide solution (NaOH),
pretreating with a sulfuric acid ($H_2SO_4$),
pretreating with a hydrochloric acid (Hel),
with ethanol ($C_2H60$) and/or water optionally being use to rinse between each step.

Optionally, the plurality of particles is treated in N-Methyl-2-pyrrolidone for at least one hour.

Optionally, the bath comprises at least one of the following substances: Ammonium chloride ($NH_4C1$), sodium citrate ($Na_3C6H_5O_7$), nickel(II)-chloride ($NiCl_2$) or other materials in the form of compounds with (chromium, zinc, etc.) and water. The process can also comprise heating the bath to more than 50° C. or roughly 60° C.

Optionally, ammoniac ($NH_3$) and then sodium phosphinate ($NaH_2PO_2$) are added to the bath.

The new production process also represents a metal compound, but with it being generated by a chemical deposition of for example nickel or other metal ions. In this case, the magnetocaloric particles can be completely coated, are significantly better protected as a result and can therefore be used for longer.

The present invention also relates to a heat exchanger with a magnetocaloric material which consists of a plurality of magnetocaloric particles which are combined into a composite material by chemical nickel plating (e.g. according to the previously-defined process).

The problems with the conventional processes for producing magnetocaloric composite materials mentioned at the outset are overcome by exemplary embodiments by a chemical deposition of nickel being used, whereby mechanically and chemically stable heat exchangers can be made. Unlike the conventional processes of metal and polymer-bound composites, improved properties can be achieved using the process according to the invention, in particular in the case of nickel plating magnetocaloric heat exchangers of La(Fe,Mn,Si)i$_3$H.

Advantages of exemplary embodiments consist in particular of the composite material produced being useful for many areas, in particular in areas where conventional magnetocaloric composite materials cannot be used (e.g. since they contain hazardous substances or toxic materials). However, exemplary embodiments enable a higher chemical stability and are more cost effective.

BRIEF DESCRIPTION OF THE FIGURES

The exemplary embodiments of the present invention will be better understood on the basis of the following detailed description and the accompanying drawings of the different exemplary embodiments, which should not, however, be understood such that they limit the disclosure to the specific embodiments, but rather merely serve as clarification and for understanding.

DETAILED DESCRIPTION

Figure 1:
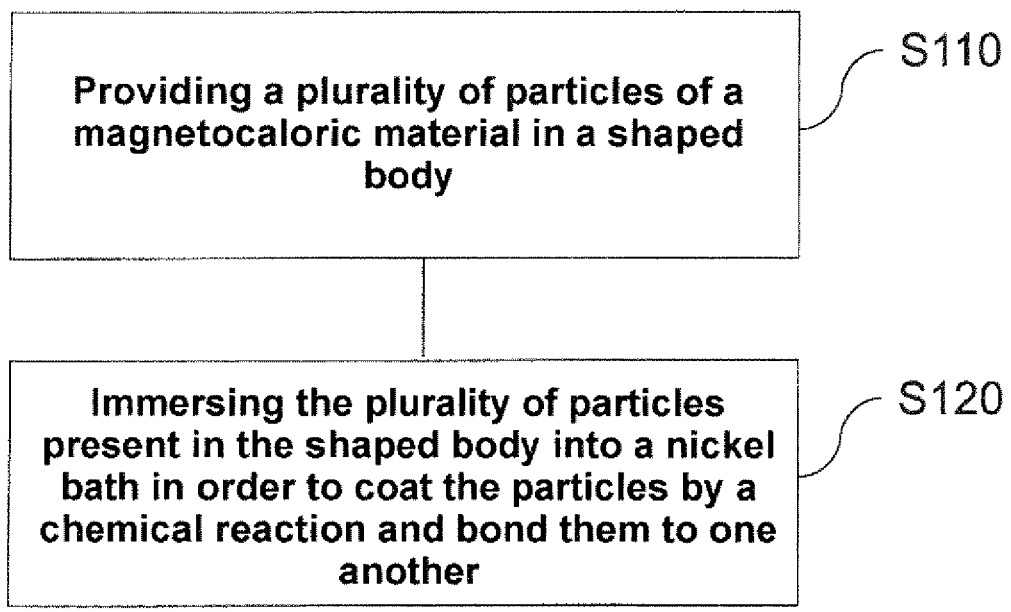
FIG. 1 shows a flow diagram of a process according to an exemplary embodiment of the present invention.

FIG. 1 shows a flow diagram of a process for producing a magnetocaloric composite material for a heat exchanger. The process comprises the steps:
providing S110 a plurality of particles of a magnetocaloric material in a shaped body; and
immersing S120 the plurality of particles present in the shaped body into a bath in order to coat the particles by a chemical reaction and bond them to one another.

The bath can in particular be a nickel bath. However, the invention should not be limited to a nickel bath. The production process can, however, have one or a plurality of the following optional steps/materials:

1. The particles can be pretreated with sodium hydroxide solution (NaOH), sulfuric acid ($H_2SO_4$) and hydrochloric acid (HCl) (ethanol ($C_2H6O$) and water ($H_2O$) can be used to rinse repeatedly between each step). An additional pretreatment can be carried out for a few hours in N-Methyl-2-pyrrolidone to remove polymer residues.
2. The exemplary nickel bath can be mixed from nickel (II)-chloride ($NiCl_2$), ammonium chloride ($NH_4Cl$), sodium citrate ($Na_3C6H_5O_7$) and water ($H_2O$) and heated to approx. 60° C.
3. Ammoniac ($NH_3$) and then sodium phosphinate ($NaH_2PO_2$) can be added.
4. Pretreated particles can then be exposed to the exemplary nickel bath.

The magnetocaloric particles 110 can be bonded into a porous structure by the chemical reaction of the particle surface of the magnetocaloric particles 110 with the exemplary nickel solution (nickel bath). At the same time, a full or uniform coating of each particle is ensured by this reaction, said particles are therefore protected from all chemical attacks. Additionally, there are no toxic components contained such that the magnetocaloric composite material is suitable for many usage purposes.

Figure 2:
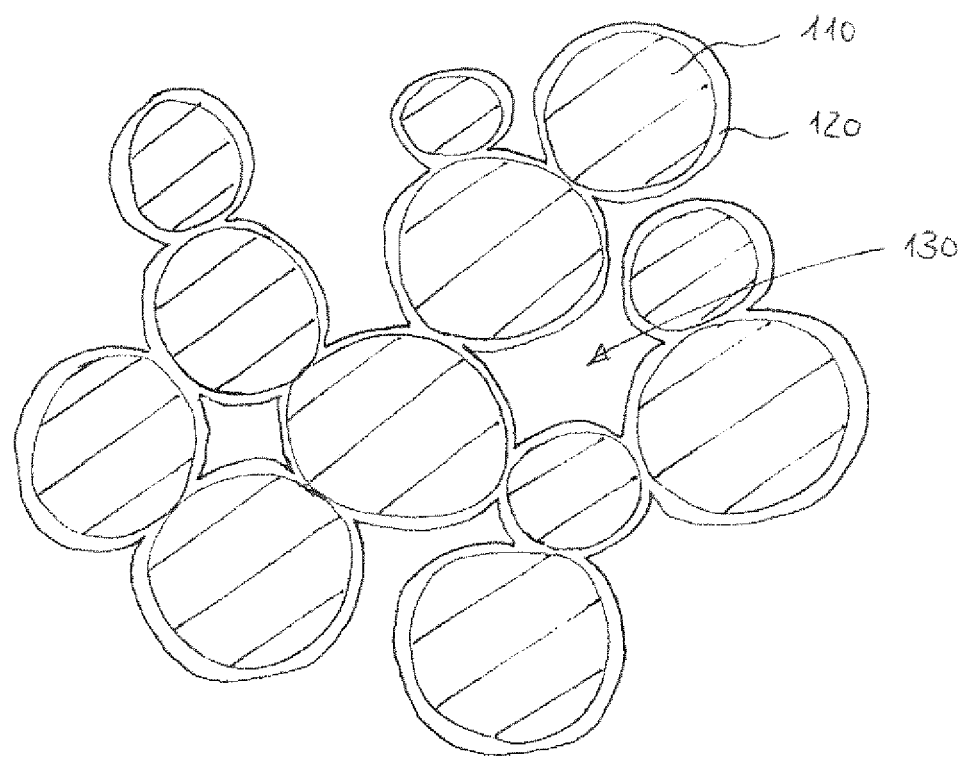
FIG. 2 shows a magnetocaloric composite material according to the production using the process according to the invention.

FIG. 2 shows, by way of example, a magnetocaloric composite material produced with a plurality of magnetocaloric particles 110 which have a nickel coating 120 (or other metal surface) due to immersing into the exemplary nickel bath, said nickel coating at the same time serves to bond the plurality of particles 110. As a result of this process, a plurality of cavities 130 are present between the nickel-plated particles 110 which can serve to pump a liquid such as for example water through and generate a heat exchanger as a result. Thus, for example the magnetocaloric material can be heated by applying the magnetic field and then a liquid such as water can be pumped through which absorbs the heat. Then, cooling takes place by a demagnetization step. The cooling generated as a result can in turn be absorbed by water and then channeled on to the medium to be cooled.

La(Fe,Mn,Si)13H heat exchangers have proven particularly effective for the potential application of magnetocaloric materials in cooling systems owing to their excellent property profile. However, the invention should not be limited to the material used. Further materials would be e.g. gadolinium, Fe2P or Ni—Mn—In Heusler compounds.

Figure 3:
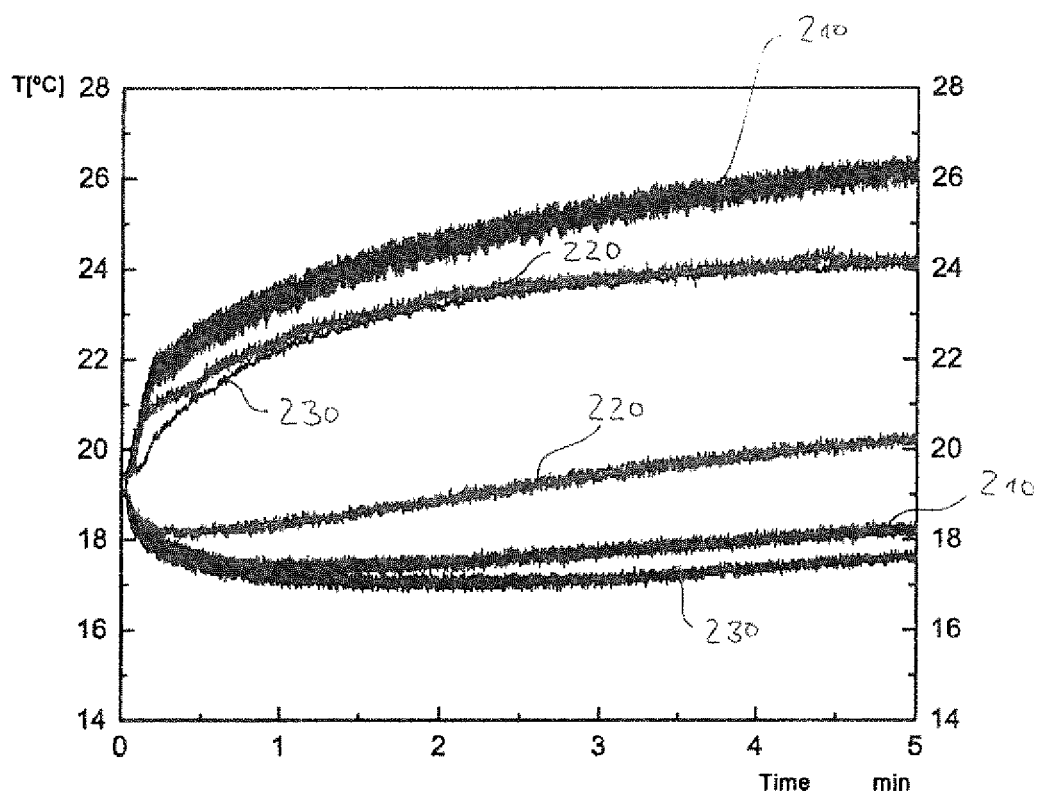
FIG. 3 shows a temperature profile of a heat exchanger during remagnetizations.

FIG. 3 shows, by way of example, a temperature profile from demonstrator measurements of identically-constructed heat exchangers. The graph 210 shows the heat exchanger according to the invention based on nickel-plated particles, the graph 220 shows the heat profile based on a polymer bond and the graph 230 shows the heat profile based on a pebble bed (without bonding). The difference between each of the two graphs shows the temperature difference that can be reached between the magnetized and demagnetized shape. It is clearly apparent that a greater temperature difference is reachable by the nickel plating than for example by the polymer bond of the magnetocaloric particles. Owing to the increased heat transfer, the saturation is significantly more quickly reached in the exemplary embodiments of the present invention (graph 20). At the same time, a higher temperature difference is generated. Accordingly, the heat exchanger works more efficiently.

Figure 4:
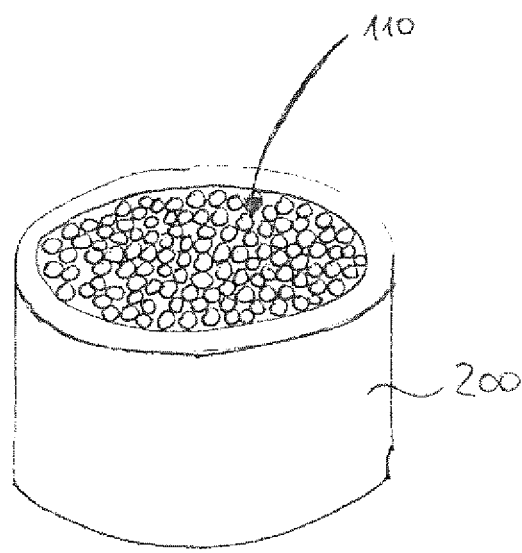
FIG. 4 shows a heat exchanger with a shaped body, which is used for production according to exemplary embodiments.

FIG. 4 shows the example of a heat exchanger with a shaped body 200 in which the plurality of particles 110 is introduced. After the particles 110 have been introduced in the shaped body 200, they are exposed to an exemplary nickel bath which leads to bonding of the particles.

The structure of the heat exchangers and the bonding of the particles 110 to one another significantly affects the efficiency during dynamic cooling processes, heat conductivity and mechanical and chemical stability. This applies particularly for use in cooling units.

The production process according to the invention offers a series of advantages in comparison to known solutions. Thus, a chemical reaction takes place on particle surfaces during nickel plating with the above-mentioned nickel solution, whereby said particle surfaces are covered with a uniform nickel layer 120 and bonded to one another. The process is comparatively simple and requires only few tools.

The manufacture of heat exchangers of nickel-plated magnetocaloric particles 110 is significantly more cost effective, unlike the conventional, magnetocaloric composite materials, which are based on metal and polymer-bound composites. The substances used for production are available cost-effectively and are non-toxic. The higher mechanical and chemical stability that can be reached guarantees a longer useful period and reuse. The magnetocaloric composite material can in particular be used for magnetic cooling units and cooling systems, but also for characterizing new magnetocaloric materials as heat exchangers.

The features of the invention disclosed in the description, claims and the figures can be essential to achieving the invention both individually and also in any combination.

LIST OF REFERENCE NUMERALS 110 magnetocaloric particles
120 metal surface layer
130 cavities
210, 220, 230 temperature profiles
200 shaped body

The invention claimed is:
1. A process for producing a magnetocaloric composite material for a heat exchanger, with the following steps:
providing a plurality of particles of a magnetocaloric material in a shaped body;
immersing the plurality of particles present in the shaped body into a liquid bath the immersing step coating the particles in the liquid bath through a chemical metal coating, the coating serving to bond the plurality of particles to one another using the coating so as to form the magnetocaloric composite material.

2. The process according to claim 1, wherein the particles are pretreated with at least one of the following steps:
   pretreating with a sodium hydroxide solution,
   pretreating with a sulfuric acid,
   pretreating with a hydrochloric acid,
   wherein ethanol and/or water are used to rinse between each step.

3. The process according to claim 1, wherein the plurality of particles are pretreated in N-Methyl-2-pyrrolidone for at least one hour.

4. The process according to claim 1, wherein the liquid bath comprises at least one of the following substances: ammonium chloride, sodium citrate, nickel(II) chloride or other metal ions, in particular made of compounds with chromium or zinc and water, and wherein the process also comprises heating the bath to more than 50° C. or roughly 60° C.

5. The process according to claim 1, wherein ammoniac and then sodium phosphinate are also added to the liquid bath.

* * * * *